United States Patent
Asai

(10) Patent No.: US 9,294,637 B2
(45) Date of Patent: Mar. 22, 2016

(54) REGISTERING AND USING A PLURALITY OF FUNCTIONS OF A PLURALITY OF IMAGE FORMING APPARATUSES

(71) Applicant: Brother Kogyo Kabushiki Kaisha, Nagoya-shi, Aichi-ken (JP)

(72) Inventor: Norihiko Asai, Tajimi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 10 days.

(21) Appl. No.: 14/469,947

(22) Filed: Aug. 27, 2014

(65) Prior Publication Data

US 2015/0077791 A1    Mar. 19, 2015

(30) Foreign Application Priority Data

Sep. 18, 2013  (JP) .................................. 2013-193383

(51) Int. Cl.
*H04N 1/00* (2006.01)
*G06F 9/44* (2006.01)

(52) U.S. Cl.
CPC .............. *H04N 1/00413* (2013.01); *G06F 9/44* (2013.01); *H04N 1/00437* (2013.01)

(58) Field of Classification Search
CPC ................................................ H04N 1/00413
USPC ........................................................ 358/1.15
See application file for complete search history.

(56) References Cited

U.S. PATENT DOCUMENTS

| 6,609,162 B1 | 8/2003 | Shimizu et al. |
| 8,019,853 B2 | 9/2011 | Machida |
| 2005/0055641 A1 | 3/2005 | Machida |

FOREIGN PATENT DOCUMENTS

| JP | 2000315182 A | 11/2000 |
| JP | 2004320621 A | 11/2004 |
| JP | 3787434 B2 | 6/2006 |

*Primary Examiner* — Eric A Rust
(74) *Attorney, Agent, or Firm* — Banner & Witcoff, Ltd.

(57) ABSTRACT

A computing device such as a terminal may acquire function information about a function provided by an external device. The device may select an input device having an input function and an output device having an output function to execute a main function comprising the input and output functions. In one example, an input function may be selected from one or more functions of the selected input device and an output function may be selected from one or more functions of the output device. A command may be output to the input device and the output device to have the devices execute a main function including the selected input and output functions. When at least one of the input device and the output device has a plurality of functions, a function to be used to execute the main function is selected from the plurality of functions.

19 Claims, 8 Drawing Sheets

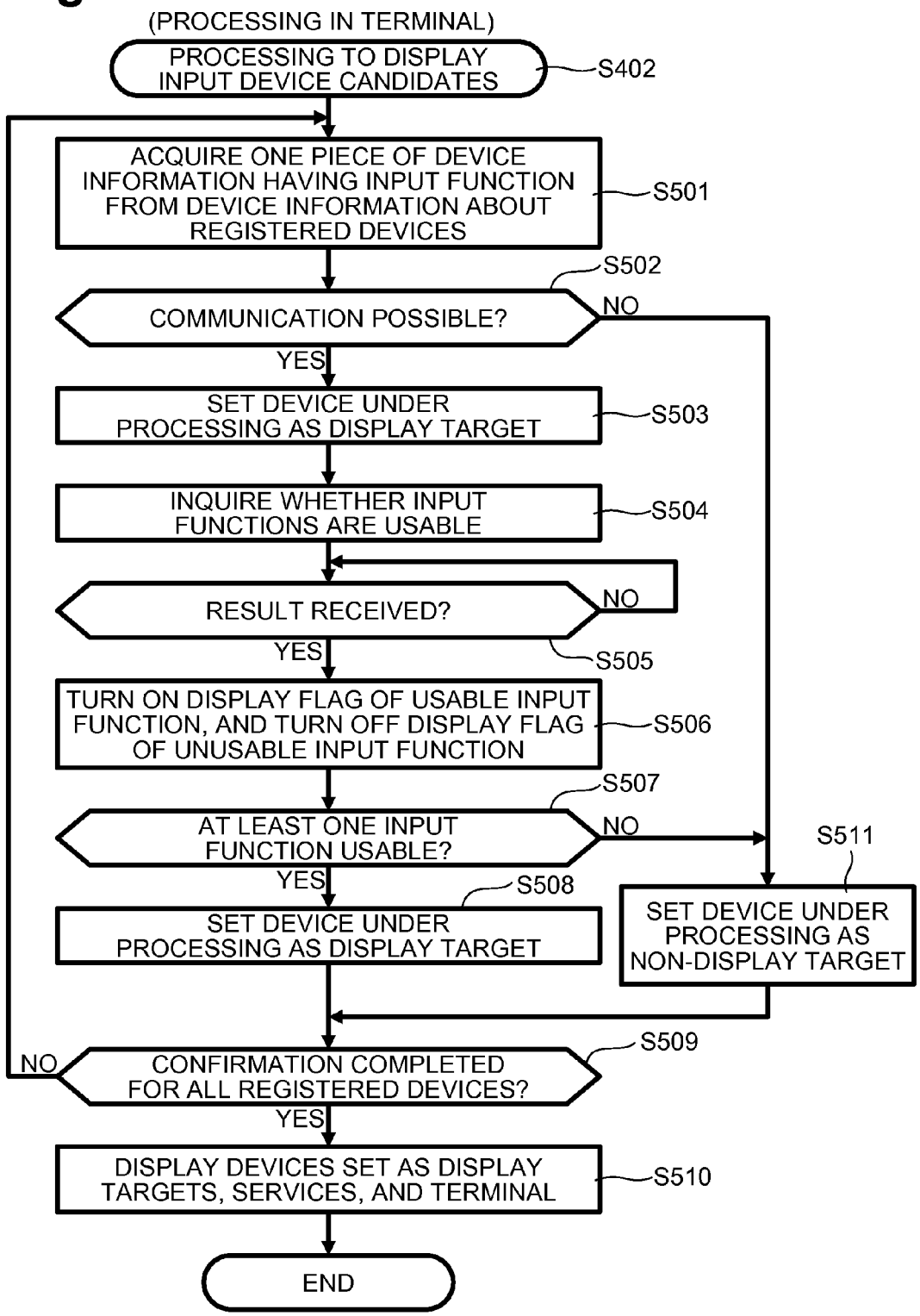

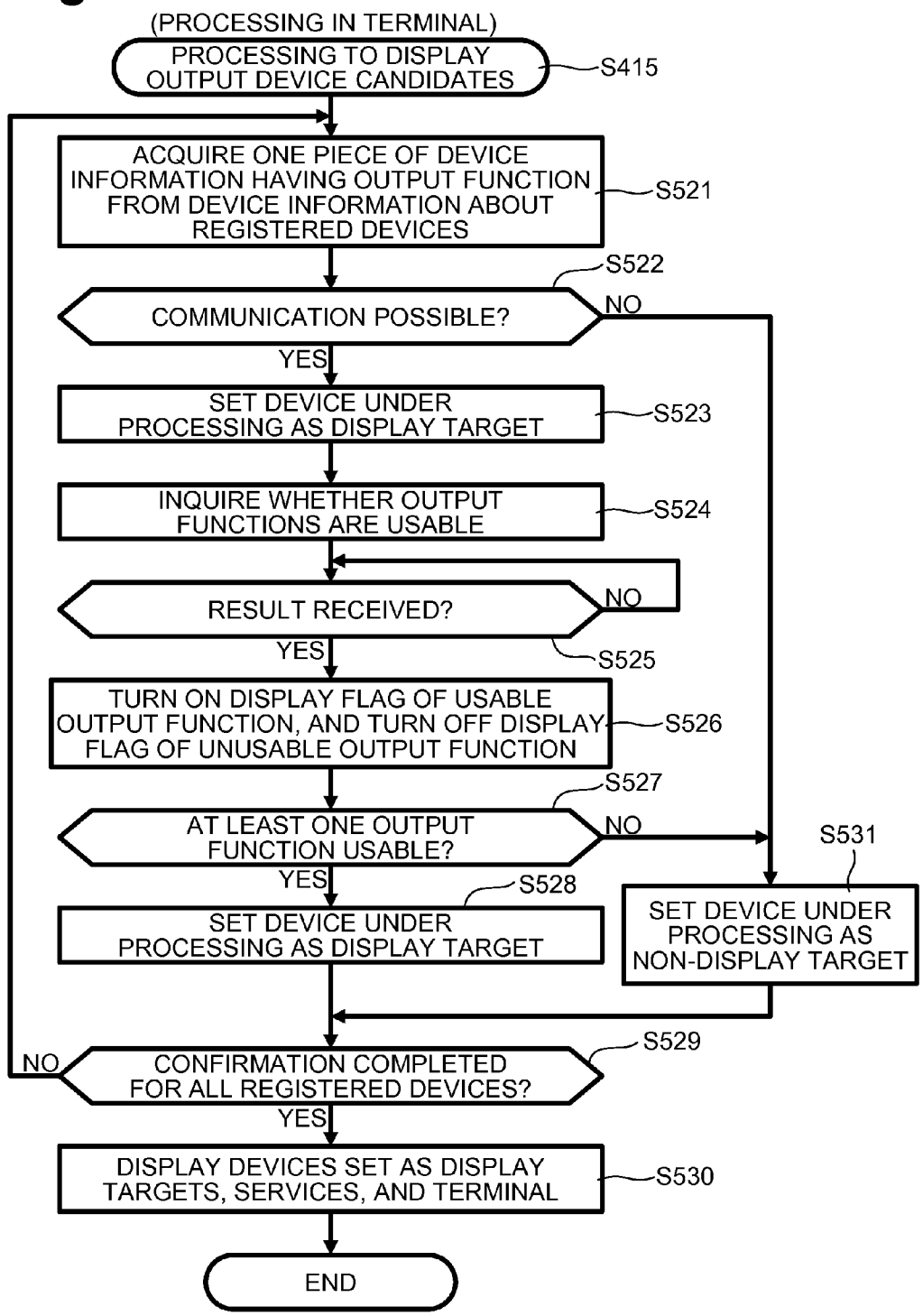

US 9,294,637 B2

REGISTERING AND USING A PLURALITY OF FUNCTIONS OF A PLURALITY OF IMAGE FORMING APPARATUSES

CROSS-REFERENCE TO RELATED APPLICATION

This application claims priority from Japanese Patent Application No. 2013-193383 filed on Sep. 18, 2013. The content of the above noted application is incorporated herein by reference in its entirety.

FIELD OF DISCLOSURE

Aspects of the disclosure relates to an information processing program and a terminal device.

BACKGROUND

In a technology known in the prior art, when a user selects one function from a plurality of functions that might only be feasible by combining a plurality of devices on a network with an image processing apparatus, a device to be combined with the image processing apparatus to implement the selected function is selected and communication with the selected device is controlled.

SUMMARY

In the above technology, input devices and output devices are intended to be single-function devices. In recent years, many multi-function peripherals (MFPs) having a scan function, a print function, and other functions have become more widely used. In the prior art, however, the use of an MFP as an input device or an output device is not considered.

Aspects provided herein provide an information processing program and computing device that enable the use of a device having a plurality of functions when a function is implemented by using at least one of the plurality of functions provided by the device connected to a network. For example, the network-connected device may have a plurality of input and/or output functions selectable for performing a combined command/function of the computing device. A user may be allowed to select one or more of the input and/or output functions to perform the combined command/function.

This summary is not intended to identify critical or essential features or aspects of the disclosure, but instead merely summarizes certain features and variations thereof. Other details and features will also be described in the sections that follow.

BRIEF DESCRIPTION OF THE DRAWINGS

FIGS. 5A and 5B are respectively a flowchart illustrating processing to display input device candidates and a flowchart illustrating processing to display output device candidates according to aspects of the disclosure.

DETAILED DESCRIPTION

Figure 1:
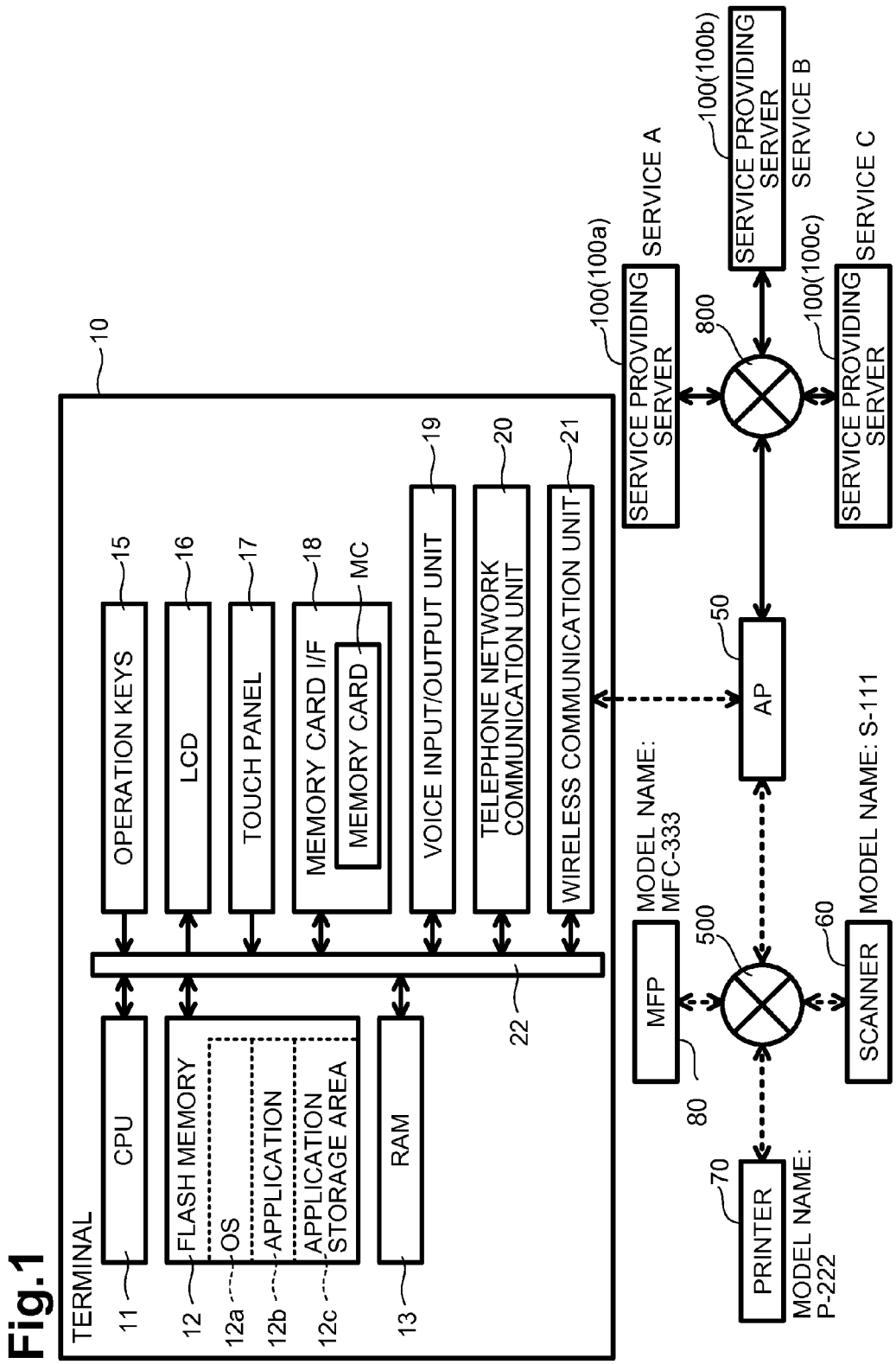
FIG. 1 is a block diagram illustrating the electric structure of a terminal according to aspects of the disclosure.

Example embodiments will be described with reference to the drawings. FIG. 1 is a block diagram of an example electric structure of a terminal 10. In the terminal 10, an application 12b, which is an example embodiment of an information processing program, is installed.

The terminal 10 in this embodiment is structured as a mobile terminal such as a smart phone. The terminal 10 includes a central processing unit (CPU) 11, a flash memory 12, a random-access memory (RAM) 13, operation keys 15, a liquid crystal display (LCD) 16, a touch panel 17, a memory card interface 18, a voice input/output unit 19, a telephone network communication unit 20, and a wireless communication unit 21. These components are mutually connected through a bus line 22.

The CPU 11 controls the components connected to the bus line 22 according to fixed values, a program, and the like stored in the flash memory 12 or another type of memory. The flash memory 12 is a rewritable non-volatile memory. In the flash memory 12, an operating system 12a and an application 12b are stored. In descriptions below, the operating system may be referred to as the OS. In the description below, the CPU 11 that executes an application, the operating system, and other programs may be indicated simply by a program name, such as, e.g., application. The OS 12a is basic software that implements the standard functions of the terminal 10. In this embodiment, the OS 12a is an ANDROID™ OS.

The application 12b is one of multiple applications that may be provided by vendors of various types of devices. The application 12b is installed in the terminal 10 by the user, after which the user can use the corresponding device from the terminal 10.

The application 12b in this embodiment enables the use of a scanner 60, a printer 70, an MFP 80, and other various types of devices connected to the a wireless local area network (LAN) 500 from the terminal 10 without passing through, for example, a personal computer.

Although additional details will be described later, the application 12b in this embodiment is structured so that a function is implemented by using an input device and an output device that are appropriately selected from various types of devices connected to the LAN 500 and various service providing servers 100, which provide various types of services, connected to the Internet 800. In one example, the application 12b can implement a function that includes performance of an input function and an output function by linking an input function of an input device and an output function of an output device. Moreover, the application 12b in this embodiment enables the MFP 80 having a plurality of functions to be used as an input device or an output device that implements a certain function, including an input function and an output function. The processes illustrated in the flowcharts OfFIGS. 2 to 6A and 6B, which will be described later, is executed by the CPU 11 according to the application 12b.

An input function executed by an input device may be, for example, a function of fetching data that the terminal 10, including the application 12b, receives as input data or of reading out the data from a storage unit in which the data is stored. Examples of the input function include a scan function of reading an original image (e.g., from a physical document) and a facsimile reception function of receiving image data from an external device. Another example of the input function includes a function of reading data from a recording media such as an internal memory or a memory card or from a storage unit such as a database.

An output function executed by an output device may be, for example, a function of producing output data according to data generated/output by the terminal 10, including the application 12b, or of recording (storing) the data in a storage unit. If, for example, the output data is image data, a print function of outputting an image to be printed according to the image data and a facsimile transmission function of transmitting the image data to an external device may correspond to example output functions. Another example of the output function is a function of storing data in a recording media such as an internal memory or a memory card or in a storage unit such as a database.

In the descriptions below, a function achieved by (e.g., including) an input function and an output function may be referred to as a main function. If, for example, the scanner 60 and printer 70 are respectively selected as an input device and an output device, the application 12b can implement a copy function as a main function, in which case the application 12b links the scan function of the scanner 60 and the print function of the printer 70 together so as to output the image data of an original image read by the scanner 60 from the printer 70 as a printed image.

In some examples, the flash memory 12 includes an application storage area 12c. The application storage area 12c is allocated to the application 12b and used by the application 12b. The application storage area 12c stores, for example, devices registered as selectable candidates of an input device or an output device (these devices will be referred to below as the registered devices) and actions registered by the user. An action is a set of main functions. In this embodiment, one or a plurality of main functions can be associated with one action. When a command to execute one action is issued, one or a plurality of main functions associated with the action are executed.

As an example, the RAM 13 is a rewritable volatile memory that has a temporary area, in which various types of data used by the CPU 11 to execute the application 12b or the like is temporarily stored. When, for example, a main function is executed, data received from an input device (e.g., input data) and data created from the input data and output to an output device (e.g., output data) are stored in the temporary area in the RAM 13.

In an example, the operation keys 15 are mechanical keys used to input a command and the like to the terminal 10. The operation keys 15 are provided on, for example, the case of the terminal 10. The LCD 16 displays various screens. The touch panel 17, which is overlaid on the LCD 16, may receive inputting of a command and the like and provide the command to the terminal 10 when the user touches the touch panel 17 with a finger, a rod, or another indicating body or brings it close to the touch panel 17. The memory card interface 18 is an interface in which a rewritable non-volatile memory card MC is mounted. For example, the memory card interface 18 may control the writing and reading of data and files to and from the memory card MC. The voice input/output unit 19 is a voice input/output device structured with a microphone, a speaker, and the like. The telephone network communication unit 20 is a circuit used to make a call through a mobile telephone network (not illustrated).

The wireless communication unit 21 is an interface used for wireless communication through a wireless LAN. In an example of this embodiment, communication performed by the wireless communication unit 21 is wireless communication through a wireless LAN complying with the IEEE802.11b/g standard. In this embodiment, the wireless communication unit 21 is connected to the LAN 500 through an access point (AP) 50, which is a relay unit. Then, the terminal 10 is connected to the scanner 60 and other various devices on the LAN 500, to which the terminal 10 is connected through the AP 50, so as to communicate with these devices.

The AP 50 having a broad-band router function can be connected to the Internet 800. Thus, the terminal 10 can access various services providing servers 100 connected to the Internet 800 and can use services provided by the accessed service providing servers 100. Examples of services provided by service providing servers 100 include DROPBOX™, EVERNOTE™, and other various services. If, for example, servers 100a, 100b, and 100c are connected to the Internet 800 as service providing servers 100 as illustrated in FIG. 1, the terminal 10 can access the servers 100a, 100b, and 100c and can use a service A, a service B, and a service C, which are respectively provided by the servers 100a, 100b, and 100c.

In one arrangement, the scanner 60 is a single-function device having a scan function, and the printer 70 is also a single-function device having a print function. For example, the scanner 60 having a scan function alone can be selected only as an input device, and the printer 70 having a print function alone can be selected only as an output device.

The MFP 80 includes a print function, a scan function, a facsimile function, and other various types of functions. In this embodiment, when the scan function or the facsimile reception function, which is part of the facsimile function, of the MFP 80 is used, the MFP 80 can be selected as an input device. Similarly, when the print function or the facsimile transmission function, which is part of the facsimile function, of the MFP 80 is used, the MFP 80 can be selected as an output device. That is, the application 12b in this embodiment can select the MFP 80 as an input device and/or as an output device.

The scanner 60, printer 70, MFP 80, and other devices each include a management information base (MIB) used under the Simple Network Management Protocol (SNMP). In the MIB of each device, the model name of the device, functions provided by the device, setting ranges of parameters for each function (e.g., settable values), an Internet protocol (IP) address, a media access control (MAC) address, a node name, and other various types of information are set.

In the example illustrated in FIG. 1, the scanner 60 with a model name S-111, the printer 70 with a model name P-222, and the MFP 80 with a model name MFC-333 are connected as devices, one device of each type. In this embodiment, all devices connected to the LAN 500 are independently (e.g., separately) identified from their model names and IP addresses assigned to the devices.

Figure 2:
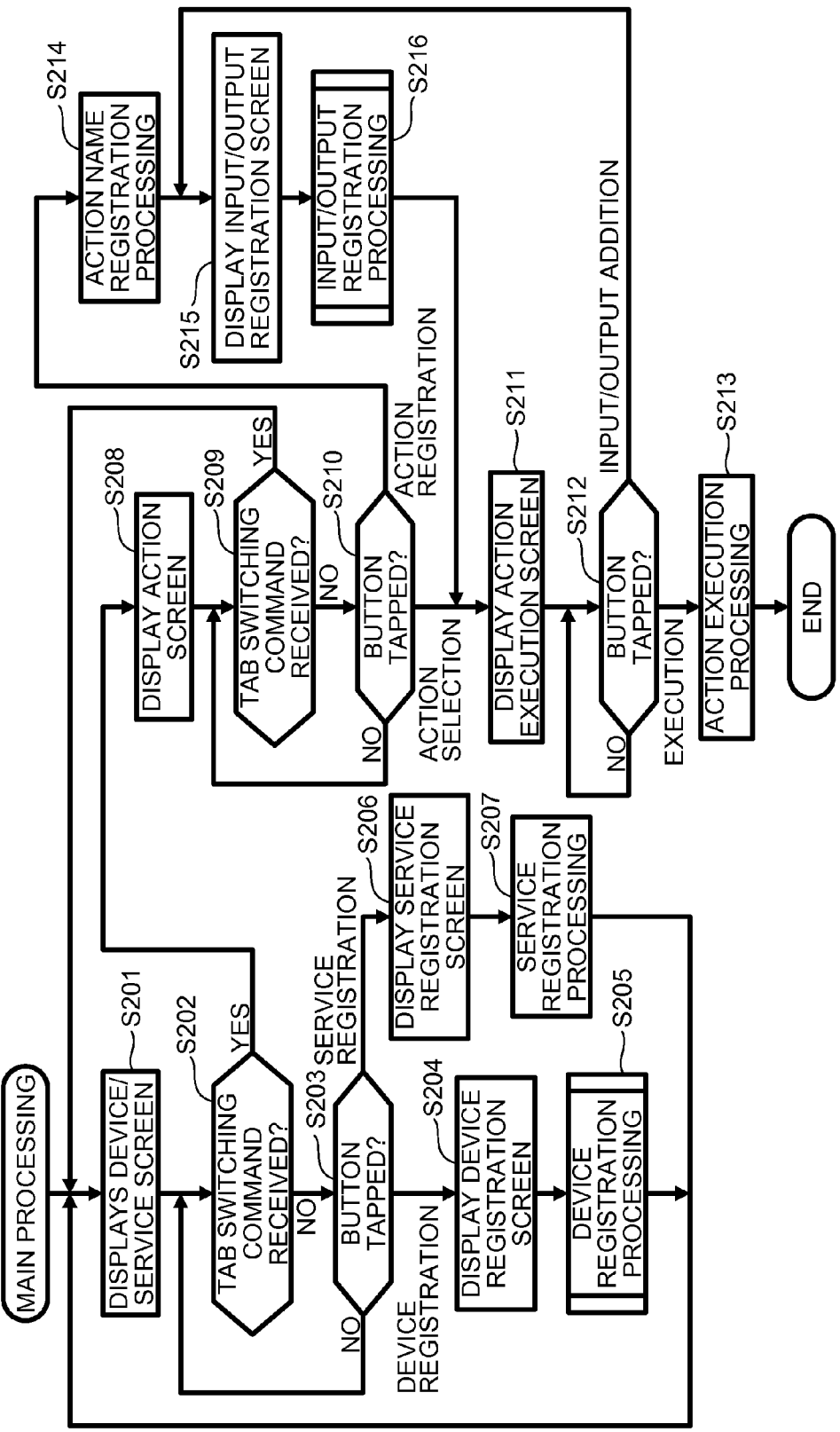
FIG. 2 is a flowchart illustrating main processing according to aspects of the disclosure.

FIG. 2 illustrates an example process executed by the CPU 11 in the terminal 10 according to the application 12b. For example, when the CPU 11 receives a command to start the application 12b, the process is started. The CPU 11 first displays a device/service screen (not illustrated) on the LCD 16. In one arrangement, the CPU 11 displays the screen in the foreground (S201). The device/service screen is used to register devices, such as the scanner 60, and service providing servers 100 as selectable input device candidates or output device candidates. While the device/service screen is displayed in the foreground, an action screen (not illustrated) enabling a user to select a desired main function to be executed is displayed in the background.

A display in the foreground is a display that is drawn on the LCD 16, and a display in the background is a display that is not drawn on the LCD 16, in which case display processing is being carried out to provide a display on the LCD 16. One of the device/service screen and the action screen is displayed in the foreground and the other is displayed in the background according to a switchover between tabs, displayed on the LCD 16, that correspond to these screens.

Accordingly, if the CPU 11 receives a tab switching command with the device/service screen displayed in the foreground (the result in S202 is Yes), the CPU 11 displays the action screen in the foreground and displays the device/service screen in the background (S206). If the CPU 11 receives a tab switching command with the action screen displayed in the foreground (the result in S209 is Yes), the CPU 11 returns the process to S201, where the CPU 11 displays the device/service screen in the foreground, and displays the action screen in the background (S201).

On the device/service screen, a device registration button to register a device and a service registration button to register a service are displayed. With the device/service screen displayed in the foreground, therefore, the CPU 11 waits for the device registration button or service registration button to be tapped (the result in S202 is No and the result in S203 is No).

If the CPU 11 accepts a tap on the device registration button (the result in S203 is "device registration"), the CPU 11 switches the screen to be displayed on the LCD 16 from the device/service screen to a device registration screen (not illustrated), through which a device may be registered (S204). The CPU 11 executes device registration processing to register a device according to the user's operation on the device registration screen (S205). Device registration processing in S205 will be described later in detail with reference to FIG. 3. Upon completion of the device registration processing in S205, the CPU 11 returns the process to S201, where the CPU 11 switches the screen to be displayed on the LCD 16 from the device registration screen to the device/service screen.

If the CPU 11 accepts a tap on the service registration button (the result in S203 is "service registration"), the CPU 11 switches the screen to be displayed on the LCD 16 from the device/service screen to a service registration screen (not illustrated), on which a service is registered (S206). The CPU 11 executes a service, for example, service registration processing to register a service providing server 100, according to the user's operation on the device registration screen (S207). A service providing server 100 may be referred to below as a service; for example, a service providing server 100 registered in S207 may be referred to below as a registered service. Upon completion of the service registration processing in S207, the CPU 11 returns the process to S201, where the CPU 11 and switches the screen to be displayed on the LCD 16 from the service registration screen to the device/service screen.

On the action screen, buttons that enable the user to register actions, each of which include one or a plurality of main functions (the buttons will be referred to below as action registration buttons), and buttons corresponding to individual actions registered by the user (these buttons will be referred to as the action selection buttons). With the action screen displayed on the foreground, therefore, the CPU 11 waits for an action registration button or action selection button to be tapped (the result in S209 is No and the result in S210 is No).

If the CPU 11 accepts a tap on an action registration button (the result in S210 is "action registration"), the CPU 11 executes action name registration processing (S214). Specifically, in the action name registration processing in S214, the CPU 11 switches the screen to be displayed on the LCD 16 from the action screen to an action name registration screen (not illustrated), through which a name to be assigned to an action to be newly registered may be registered according to the user's operation on the action name registration screen (this name will be referred to below as the action name).

Upon completion of the action name registration processing in S214, the CPU 11 switches the screen to be displayed on the LCD 16 from the action name registration screen to an input/output registration screen (not illustrated) (S215). On the input/output registration screen, an input device and an output device are registered to implement one or a plurality of main functions to be associated with an action identified by one registered action name.

The CPU 11 executes input/output registration processing to register an input device or output device according to the user's operation on the input/output registration screen (S216). Input/output registration processing in S216 will be described later in detail with reference to FIG. 4. In the input/output registration processing of S216, a device registered in the device registration processing in S205 or a service providing server 100 registered in the service registration processing in S207 is selected and registered as the input device or output device.

With the application 12b in this embodiment, one or a plurality of input devices and one or a plurality of output devices can be registered for an action identified by one action name. For example, one main function having the input function of a registered input device and the output function of a registered output device in one-to-one correspondence can be associated with one action for each combination of a registered input device and a registered output device. Therefore, when one action name is selected, if a plurality of main function are associated with the action identified by the one action name, all of the plurality of main functions can be executed.

Upon completion of the input/output registration processing in S216, the CPU 11 switches the screen to be displayed on the LCD 16 from the input/output registration screen to an action execution screen (not illustrated) (S211). On the action execution screen, one of the registered actions is executed. For example, when the action execution screen is displayed on the LCD 16 after execution of the input/output registration processing in S216, an action registered in the input/output registration processing in S216 is executed on the action execution screen.

If the CPU 11 accepts or otherwise detects a tap on one action selection button on the action execution screen (e.g., the result in S210 is "action selection"), the CPU 11 causes the process to proceed to S211, where the CPU 11 switches the screen to be displayed on the LCD 16 from the action screen to the action execution screen. For example, the action execution screen displayed on the LCD 16 in response to a tap on the action selection button is a screen on which the action corresponding to the tapped action selection button is executed.

With the action execution screen displayed, therefore, the CPU 11 waits for the input/output addition button or execution button to be tapped or otherwise selected (the result in S212 is No). If the CPU 11 accepts a tap on or otherwise detects selection of the input/output addition button (the result in S212 is "input/output addition"), the CPU 11 causes the process to proceed to S215, where the CPU 11 switches the screen to be displayed on the LCD 16 from the action execution screen to the input/output registration screen.

If the CPU 11 accepts a tap on or otherwise detects selection of the execution button (the result in S212 is "execution"), the CPU 11 executes action execution processing, in which action corresponding to the action execution screen being displayed is executed (S213), and terminates the main processing.

Figure 3:
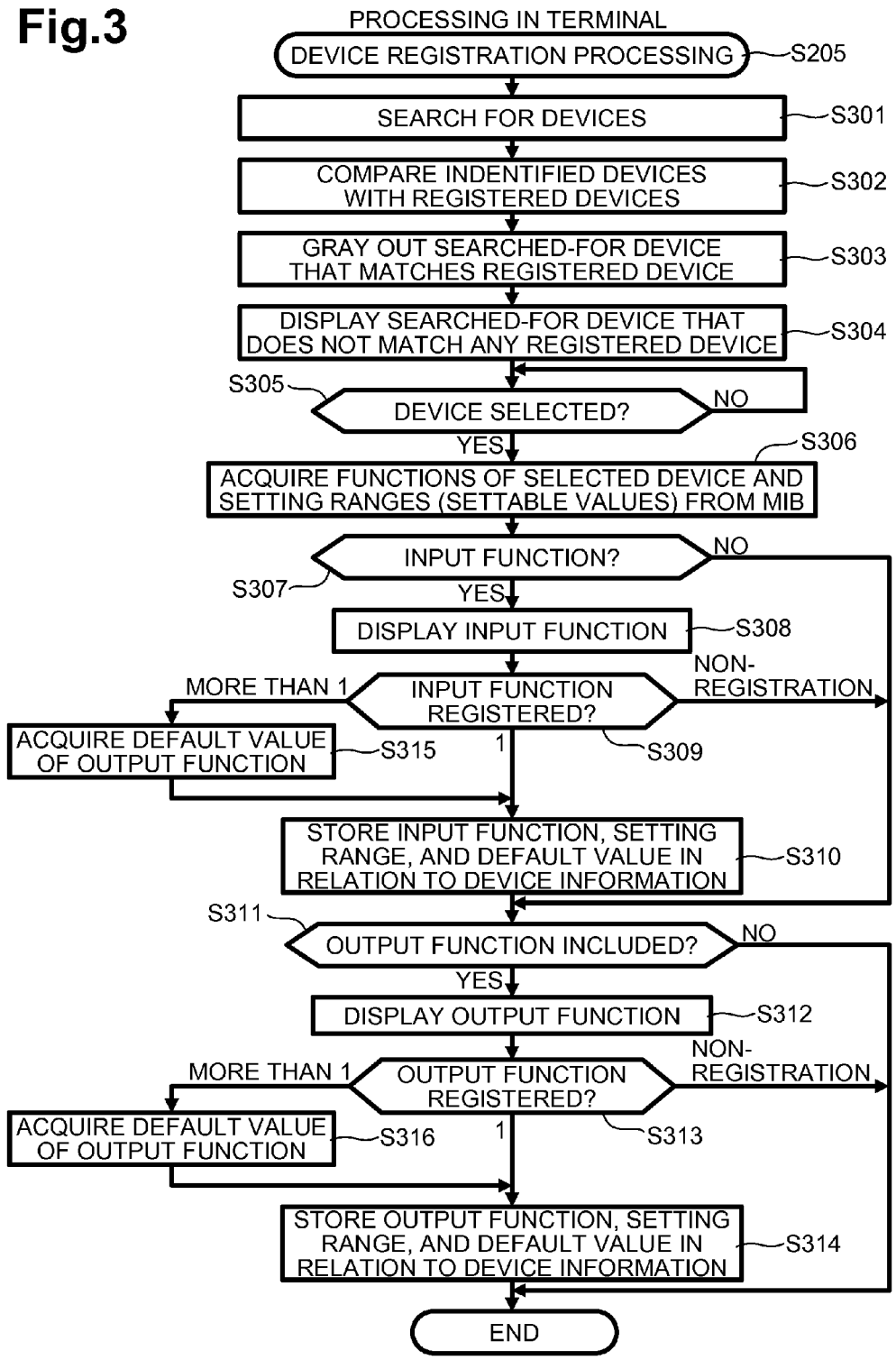
FIG. 3 is a flowchart illustrating device registration processing according to aspects of the disclosure.

FIG. 3 is a flowchart illustrating the device registration processing in S205 described above. The CPU 11 first searches for devices connected to the LAN 500 (S301). In one example, the CPU 11 broadcasts a search packet from the wireless communication unit 21 to the LAN 500 and receives the model names and IP addresses of devices as responses, after which the CPU 11 identifies the devices connected to the LAN 500 from the received model names and IP addresses.

The CPU 11 compares the devices identified by the search of S301 with devices stored in the application storage area 12c as registered devices (S302). Specifically, the CPU 11 compares the model names and IP addresses of the searched-for devices, e.g., the devices identified in S301, with the model names and IP addresses of the registered devices. If a searched-for device matches a registered device, the CPU 11 grays out the searched-for device on the device registration screen (S303) as a registered device. If a searched-for device does not match any registered device, the CPU 11 displays the searched-for device on the device registration screen as a non-registered device so as to be selectable (S304).

In S302 to S304 above, only the non-registered devices of the devices that have been found from the LAN 500 are displayed so as to be selectable. As such, it is possible to prevent devices already stored as registered devices from being stored and/or registered more than once. The registered devices of the devices that have been searched for from the LAN 500 are also grayed out, to indicate to the user that there are registered devices on the LAN 500.

Additionally or alternatively, the CPU 11 waits until it is informed through the touch panel 17 that one of the displayed selectable device(s) has been selected (the result in S305 is No). If the CPU 11 is informed in S305 that a selectable device has been selected (the result in S305 is Yes), the CPU 11 acquires the functions of the selected device and the setting ranges of parameters set in the functions (e.g., settable values) from the MIB (S306). Specifically, the CPU 11 transmits, to the selected device, a request to acquire information stored in the MIB under the SNMP. Upon receipt of the acquisition request, the selected device replies to terminal 10 with various types of information about the device, such as the information being stored in the MIB. Accordingly, in S306, the CPU 11 acquires the functions of the selected device and the setting ranges of parameters set in the functions (e.g., a setting range), which are included in information received from the device to which the acquisition request has been transmitted.

Subsequently, the CPU 11 decides whether an input function is included in the functions, acquired in S306, of the selected device (S307). The application storage area 12c includes a table (not illustrated) in which each function is classified as an input function or an output function. Accordingly, the CPU 11 references the table in S307 and decides whether an input function is included in the functions, acquired in S306, of the selected device. In the above-noted table, the scan function, the facsimile function (e.g., facsimile reception function), the function of reading data from the memory card MC, and the like, for example, are classified as input functions. The print function, the facsimile function (e.g., facsimile transmission function), the function of writing data to the memory card MC, and the like, for example, are classified as output functions.

If the CPU 11 decides in S307 that an input function is included in the selected device (the result in S307 is Yes), the CPU 11 displays the function included in the selected device on the LCD 16 as an input function (S308). If the selected device has a plurality of input functions, the CPU 11 displays the plurality of input functions, e.g., in an aligned state. In S308, the CPU 11 displays a checkbox in front of each input function of the selected device. An input function with a checked checkbox may be identified as a selected input function to be registered. In this embodiment, it is assumed that, in an initial state, all input functions of the selected device are selected as input functions to be registered. For example, all of the checkboxes of the input functions are all checked. Of the functions of the selected device, the user can select desired input functions to be registered by appropriately checking and unchecking the checkboxes.

In S308, the CPU 11 displays radio buttons at positions adjacent to the input functions and checks a radio button corresponding to an input function set as a default. Input functions to be defaulted are prioritized. For example, of the input functions of the selected device, the input function having the highest priority may be set as the default. If the selected device has a plurality of input functions, the user can change the default input function by checking and unchecking their radio buttons. In this embodiment, it is assumed that only the radio button of the device selected as a target to be registered, e.g., the device with a checked checkbox, can be selected.

If the CPU 11 accepts a registration command through the touch panel 17 while one input function to be registered is selected (the result in S309 is 1), the CPU 11 stores the input function to be registered, a setting range corresponding to the input function, and a default value by which the one input function is defaulted, in relation to device information that identifies the device to be registered (S310). Then, the CPU 11 causes the process to proceed to S311. As a result of processing in S310, the selected device is stored in the application storage area 12c as a registered device (e.g., a registered device that may become an input device candidate). In this embodiment, device information includes the model name and IP address of a device.

If the CPU 11 accepts a registration command through the touch panel 17 while a plurality of input functions to be registered are selected (the result in S309 is "more than one"), the CPU 11 acquires a default value by which one input function with a checked radio button is defaulted among the plurality of input functions selected as targets to be registered (S315). The CPU 11 then causes the process to proceed to S310, where the CPU 11 stores, in the application storage area 12c, each input function to be registered, a setting range corresponding to the input function, and the default value obtained in S315 as a registered device, in relation to device information that identifies the device to be registered.

If no input device is registered in S309 (the result in S309 is "non-registration") or the selected device has no input function in S307 (the result in S307 is No), the CPU 11 causes the process to proceed to S311. Non-registration of an input function occurs, for example when a registration command is entered while no input function to be registered is selected and when a command to cancel registration of an input function is entered.

The CPU 11 decides whether an output function is included in the functions, acquired in S306, of the selected device (S311). A decision in S311 is made similar to that of S307, except that the determination is performed for output functions instead of input functions. If the CPU 11 decides in S311 that an output function is included in the selected device (the result in S311 is Yes), the CPU 11 displays the function included in the selected device on the LCD 16 as an output function (S312). If the selected device has a plurality of output functions, the CPU 11 displays the plurality of input functions, e.g., in an aligned state.

In S311, the CPU 11 displays a checkbox in front of each output function of the selected device. The CPU 11 also displays radio buttons at positions adjacent to the output functions and activates a radio button corresponding to an output function set as a default. The checkboxes and radio buttons displayed in S311 are operated in the same way as the checkboxes and radio buttons described in S308 above.

If the CPU 11 accepts a registration command through the touch panel 17 while one output function to be registered is selected (the result in S313 is 1), the CPU 11 stores, in the application storage area 12c, the output function to be registered, a setting range corresponding to the output function, and a default value by which the one output function is defaulted, in relation to device information that identifies the device to be registered (S314). The CPU 11 then terminates the device registration processing. As a result of processing in S314, the selected device is stored in the application storage area 12c as a registered device (e.g., a registered device that may become an output device candidate).

If the CPU 11 accepts a registration command through the touch panel 17 while a plurality of output functions to be registered are selected (the result in S313 is "more than one"), the CPU 11 acquires a default value by which one output function with an activated radio button is defaulted among the plurality of output functions selected as targets to be registered (S316). The CPU 11 then causes the process to proceed to S314, where the CPU 11 stores, in the application storage area 12c, each output function to be registered, a setting range corresponding to the output function, and the default value obtained in S316 as a registered device, in relation to device information that identifies the device to be registered.

If no input device is registered in S313 (the result in S313 is "non-registration") or the selected device has no output function in S311 (the result in S311 is No), the CPU 11 terminates the device registration processing.

Non-registration of an output function occurs, for example, when a registration command is entered while no output function to be registered is selected and when a command to cancel registration of an output function is entered.

According to the device registration processing described above in S205, if a device connected to the LAN 500 has both an input function and an output function, the device can be registered as a device that can become an input device candidate and/or an output device candidate depending on the user's request. Accordingly, a device having both an input function and an output function can be used as either an input device or an output device or both.

If one device has a plurality of input functions, only user-requested input functions of the plurality of input functions may be registered as input functions usable by the registered device. Similarly, only user-requested output functions of the plurality of output functions may be registered as output functions usable by the registered device.

The registered device is associated with a setting range corresponding to each input function or output function, so that when the registered device is used as an input device or output device, it is possible to prevent the input functions or output functions of the registered device from being executed based on an unusable/incompatible parameter. Furthermore, each registered device is associated with a value that determines a default input function or output function (e.g., a default value), so that when an input function or output function used to execute a main function is selected from a plurality of input functions or a plurality of output functions, a process of selecting the input function or output function can be reduced.

Figure 4:
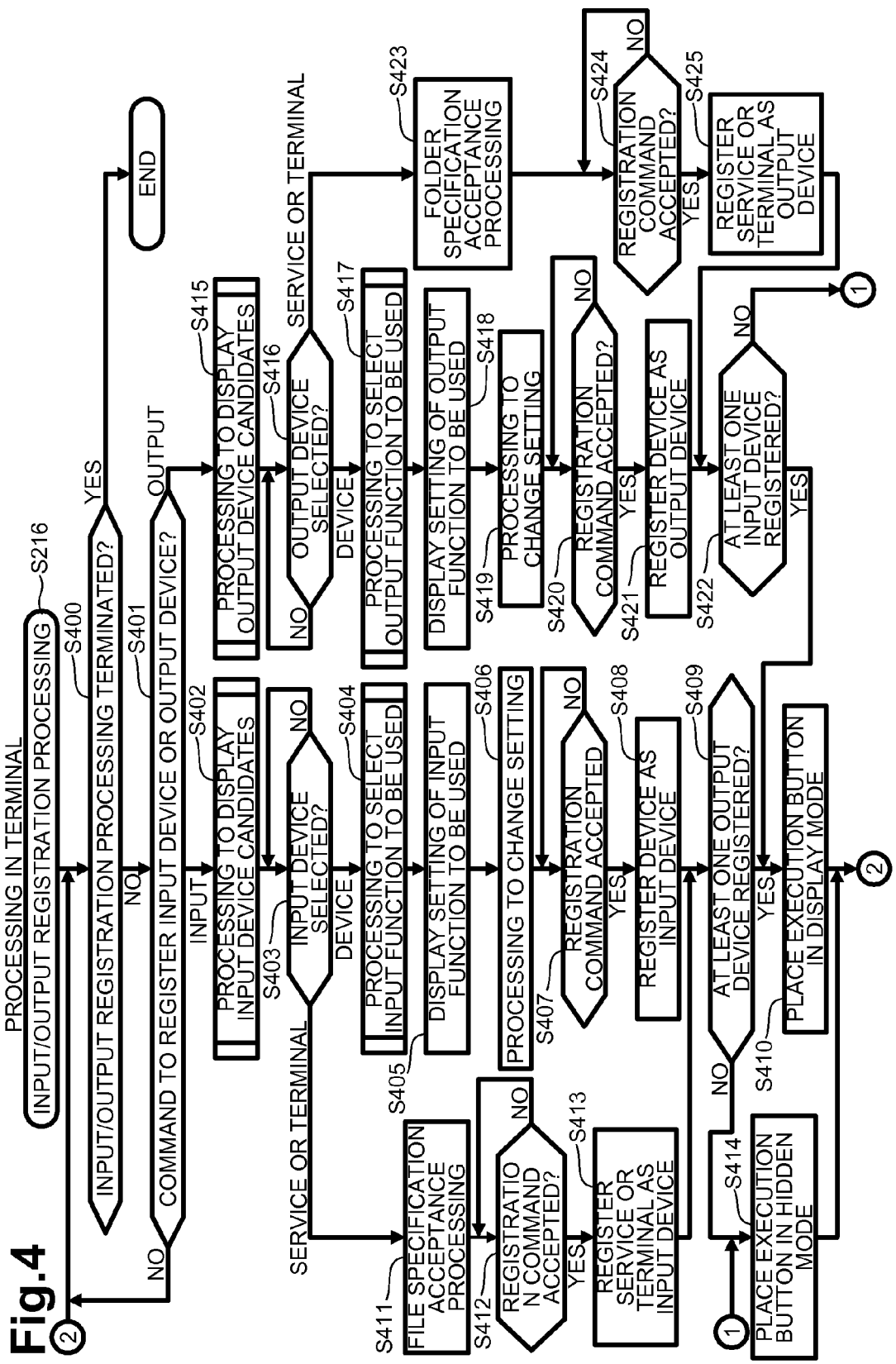
FIG. 4 is a flowchart illustrating input/output registration processing according to aspects of the disclosure.

FIG. 4 is a flowchart illustrating the input/output registration processing described above in S216. The CPU 11 may initially decide whether to terminate the input/output registration processing (S400). For example, a registration termination button that commands termination of a registration of an input device or output device is provided on the input/output registration screen; if the CPU 11 accepts a tap on or otherwise detects selection of the registration termination button through the touch panel 17, the CPU 11 decides in S400 that the input/output registration processing is to be terminated. Therefore, if the CPU 11 produces a Yes result in S400, the CPU 11 terminates the input/output registration processing.

If the CPU 11 produces a No result in S400, the CPU 11 decides whether it has accepted a command to register an input device or output device through the touch panel 17 (S401). If the CPU 11 has not accepted such a command (the result in S401 is No), the CPU 11 returns to S400.

If the CPU 11 decides in S401 that a command to register an input device (the result in S401 is "input") has been accepted, the CPU 11 executes processing, which will be described in further detail later with reference to FIG. 5A, to display input device candidates (S402). In the processing in S402, devices that become input device candidates, services, and the terminal 10 are displayed on the input/output registration screen. The CPU 11 waits until an input device to be registered for the current action is selected from the input device candidates displayed on the input/output registration screen in the processing in S402 (the result in S403 is No).

If a device is selected as the input device to be registered for the current action (the result in S403 is "device"), the CPU 11 executes processing to select an input function used to execute a main function from the input functions of the selected device (S404). The processing in S404 will be described later in further detail with reference to FIG. 6A.

The CPU 11 displays the setting of the input function selected in S404 (S405), and executes processing to change the setting to a value desired by the user within the setting range of the selected input function (S406), after which the CPU 11 proceeds to S407. If the user uses the setting displayed in S405 without alteration, the processing in S406 is omitted. The CPU 11 waits until it accepts or otherwise detects, through the touch panel 17, a command to register the device selected as an input device, as an input device for the current action (the result in S407 is No).

If the CPU 11 receives such a command (the result in S407 is Yes), the CPU 11 registers the device selected in S402 as an input device for the current action (S408). For example, the CPU 11 stores, in the application storage area 12c, device information corresponding to the device selected in S402, the input function selected in S404, and the setting of the input function as the input device for the current action. Upon completion of the processing in S408, the CPU 11 causes the process to proceed to S409.

If a service (e.g., a service providing server 100) or the terminal 10 is selected as the input device to be registered for the current action (the result in S403 is "service" or "terminal"), the CPU 11 executes file specification acceptance processing (S411). In the file specification acceptance processing of S411, if the user specifies one or more files to be read as input data from the files stored in a database in the service providing server 100 (selected as an input device) or stored in the memory card MC mounted in the memory card interface 18 in the terminal 10, the specification is accepted.

Upon completion of the file specification acceptance processing in S411, the CPU 11 waits unit it accepts or otherwise detects, through the touch panel 17, a command to register the service providing server 100 or terminal 10 selected as an input device, as an input device for the current action (the result in S412 is No). If the CPU 11 receives such a command (the result in S412 is Yes), the CPU 11 registers the service providing server 100 or terminal 10 selected in S402 as the input device for the current action (S413). For example, the CPU 11 stores, in the application storage area 12c, a service name corresponding to the service providing server 100 or terminal 10 selected in S402 or a name indicating the terminal 10 and the file name or file names of the one or more files specified in S411 as the input for the current action. Upon completion of the processing in S413, the CPU 11 proceeds to S409.

The CPU 11 decides in S409 whether at least one output device has been registered for the current action. If the CPU 11 decides that at least one output device has been registered (the result in S409 is Yes), the CPU 11 enables a mode in which an execution button is displayed on the action execution screen (S410) and returns the process to S400. Then, upon completion of the input/output registration processing, the execution button is displayed on the action execution screen displayed on the LCD 16 instead of the input/output registration screen.

If the CPU 11 decides that no output device has been registered (the result in S409 is No), the CPU 11 enables a mode in which the execution button is hidden on the action execution screen (S414) and returns the process to S400. Then, upon completion of the input/output registration processing, the execution button is not displayed on the action execution screen displayed on the LCD 16 instead of the input/output registration screen.

If the CPU 11 decides in S401 that it has accepted a command to register an output device (the result in S401 is "output"), the CPU 11 executes processing, which will be described later in further detail with reference to FIG. 5B, to display output device candidates (S415). In the processing in S415, devices that become output device candidates, services, and the terminal 10 are displayed on the input/output registration screen. The CPU 11 waits until an output device to be registered for the current action is selected from the output device candidates displayed on the input/output registration screen in S415 (the result in S416 is No).

If a device is selected as the output device to be registered for the current action (the result in S416 is "device"), the CPU 11 executes processing to select an output function used to execute a main function from the output functions of the selected device (S417). The processing in S417 will be described later in further detail with reference to FIG. 6B. The CPU 11 executes processing in S418 to S421 and proceeds to S422. The processing in S418 to S421 is the same as in S405 to S408, except that the processing relates to output instead of input. Accordingly, the specific description with respect to output is omitted.

If a service (e.g., a service providing server 100) or the terminal 10 is selected as the output device to be registered for the current action (the result in S416 is "service" or "terminal"), the CPU 11 executes folder specification acceptance processing (S423). In the folder specification acceptance processing in S423, if the user specifies a folder created in a database in the service providing server 100 (selected as an output device) or created in the memory card MC mounted in the memory card interface 18 in the terminal 10 set as a destination for storing output data, the specification is accepted.

Upon completion of the folder specification acceptance processing in S423, the CPU 11 executes processing in S424 and S425 and proceeds to S422. The processing in S424 and S425 is the same as in S412 and S413, except that the processing relates to output and an output folder instead of input and an input file. Accordingly, the specific description of S424 and S425 will be omitted.

The CPU 11 decides in S422 whether at least one input device has been registered for the current action. If the CPU 11 decides that at least one input device has been registered (the result in S422 is Yes), the CPU 11 proceeds to S410. If the CPU 11 decides that any input device has not been registered (the result in S422 is No), the CPU 11 proceeds to S414.

As described above, the input/output registration processing is executed without being terminated until the CPU 11 decides in S400 that the processing is to be terminated. Accordingly, the user can register a plurality of input devices or output devices for one action as necessary or desired until the user operates the registration termination button.

In the processing in S409, S410, S414, and S422, under the condition that at least one input device and output device pair has been registered for one action, an execution button that commands the action to be started is displayed on the action execution screen. For example, the execution button is displayed on the action execution screen under the condition that at least one main function is executable. Therefore, if any one of an input device and an output device has not been registered, the execution button is not displayed. This prevents the user from operating the execution button to execute a main function in spite of the main function not being executable (e.g., missing an input function or an output function).

FIG. 5A is a flowchart illustrating the processing described in S402 above in which input device candidates are displayed. The CPU 11 acquires, as device information about a device under processing, device information having an input function from device information stored in the application storage area 12c as registered devices (S501). The CPU 11 then decides whether communication with the device under processing is possible (S502). Specifically, the CPU 11 transmits a packet by using the IP address included in the device information as the destination. If the terminal 10 receives a reply to the packet, the CPU 11 decides that communication with the device under processing, e.g., the device to which the packet has been transmitted, is possible.

If the CPU 11 decides that communication with the device under processing is possible (the result in S502 is Yes), the CPU 11 inquires of the device under processing whether its input functions are usable (S504). The device under processing returns, as a response to the inquiry, e.g., information indicating whether the input functions of the device under processing are usable, to the terminal 10. Input functions may be unusable if they have some type of error although the device under processing is ready for communication; for example, the scan function of the scanner 60 or MFP 80 cannot be used because the device's cover is open, or the remaining storage capacity of the memory in the MFP 80 is too small to use its facsimile reception function. Another example of the inability to use the input functions is that their use is limited by the manager of the device under processing.

The CPU 11 waits for the terminal 10 to receive an inquiry result from the device under processing (the result in S505 is No). If the terminal 10 receives an inquiry response from the device under processing (the result in S505 is Yes), the CPU 11 turns on or off a display flag of each input function of the device under processing depending on whether the input function is usable, which is determined from the inquiry response that the terminal 10 has received from the device under processing (S506). For example, the CPU 11 turns on the display flag of a usable input function, and turns off the display flag of an unusable input function.

If at least one input function is usable (the result in S507 is Yes), the CPU 11 sets the device under processing as a display target (S508) and causes the process to proceed to S509. If none of the input functions are usable (the result in S507 is No), the CPU 11 sets the device under processing as a non-display target (S511) and causes the process to proceed to S509. If the CPU 11 decides in S502 that communication with the device under processing is not possible (the result in S502 is No), the CPU 11 causes the process to proceed to S511, where the CPU 11 sets the device under processing as a non-display target.

If confirmation has not been completed for all registered devices (the result in S509 is No), the CPU 11 returns the process to S501 and 11 repeats the processing in S501 to S508 and S511 for another device, having input functions, included in the non-processed registered devices. If confirmation has been completed for all registered devices (the result in S509 is Yes), the CPU 11 displays the registered devices, having input functions, that have been set as display targets, registered services, and terminal 10 on the input/output registration screen as input device candidates so as to be selected (S510), and terminates the processing to display input device candidates.

In the processing in S402 described above in which input device candidates are displayed, only registered devices that have at least one usable input function and with which communication is possible are displayed as input device candidates. For example, only devices that are currently usable as input devices for an action are displayed.

FIG. 5B is a flowchart illustrating the processing described in S415 above in which output device candidates are displayed. In this processing to display output device candidates, the CPU 11 executes processing in S521 to S531, which is the same as in S501 to S511, except that the processing relates to output rather than input. Accordingly, the specific descriptions of S521 to S531 will be omitted.

In S525, the CPU 11 receives, from the device under processing, a result of an inquiry as to whether output functions are usable. For example, CPU 11 may receive information as to whether the output functions of the device under processing are usable. The output functions are unusable if they have some type of error although the device under processing is ready for communication; for example, the print function of the printer 70 or MFP 80 cannot be used because it has caused a paper jam, or the remaining storage capacity of the memory card in the MFP 80 is too small to use a function of writing data to the memory card. Another example of the inability to use the output functions is that their use is limited by the manager of the device under processing.

In the processing in S415 described above in which output device candidates are displayed, only registered devices that have at least one usable output function and with which communication is possible are displayed as output device candidates. For example, only devices that are currently usable as output devices for one action are displayed.

Figure 6A:
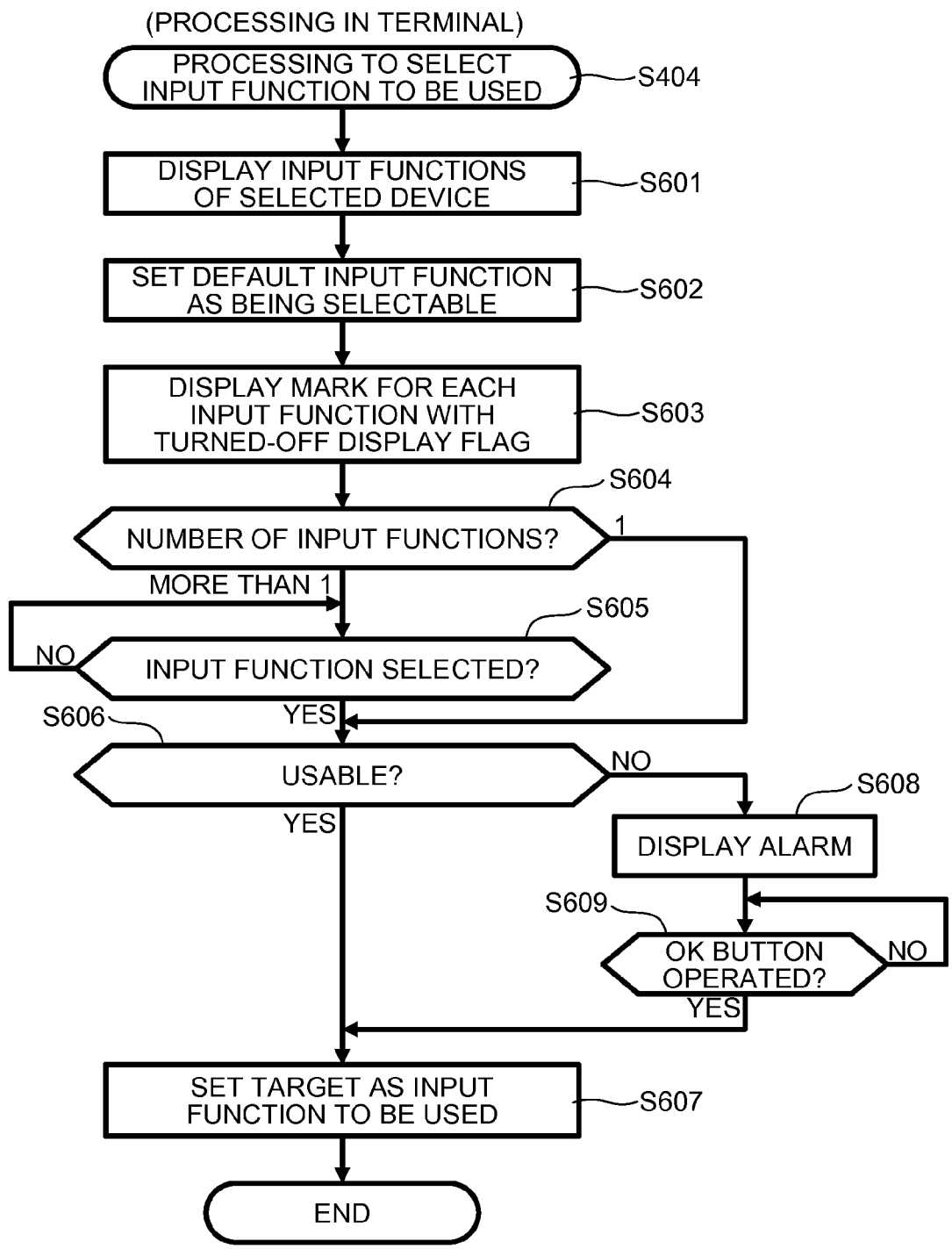
FIGS. 6A and 6B are respectively a flowchart illustrating processing to select an input function to be used and a flowchart illustrating processing to select an output function to be used according to aspects of the disclosure.

FIG. 6A is a flowchart illustrating the processing in S404 described above in which an input function to be used is selected. The CPU 11 references the application storage area 12c and displays, on the input/output registration screen, input functions associated with device information corresponding to devices selected as input devices (S601). In S601, the CPU 11 also displays radio buttons at positions adjacent to the input functions.

With reference to the application storage area 12c, the CPU 11 selects the default input function from the input functions displayed in S601 according to the default values of the input functions associated with the device information and sets the selected default input function as being selected (S602).

Thus, of the radio buttons displayed in the processing in S601, the radio button corresponding to the default input function is activated.

The CPU 11 displays, for example, an exclamation mark '!' for each input function with a turned-off display flag to call the user's attention (S603). The display flag referenced in S603 is set in S506 (FIG. 5A) for each input function of the device selected as an input device.

If a plurality of input functions are displayed in S601 (the result in S604 is "more than one"), the CPU 11 waits until it is informed that one of the plurality of input functions has been selected through the touch panel 17 (the result in S605 is No). The user can select a desired input function from the plurality of input functions by appropriately activating and de-activating the radio buttons. If one input function is selected (the result in S605 is Yes), the CPU 11 causes the process to proceed to S606. If only one input function is displayed in S601 (the result in S604 is "one"), the CPU 11 proceeds to S606.

The CPU 11 decides in S606 whether the one input function selected from the plurality of input functions or the only one input function of the device selected as an input device is currently usable (S606). This decision is made by referring, as in S603, to the display flags set for the input functions of the device selected as an input device in S506.

If the CPU 11 decides that the target input function is currently usable (the result in S606 is Yes), the CPU 11 sets the target input function as an input function to be used (S607) and terminates the process for selecting an input function to be used.

If the CPU 11 decides that the target input function is currently unusable (the result in S606 is No), the CPU 11 displays an alarm (not illustrated) that informs the user (S608). In one example, the alarm includes an OK button. The CPU 11 waits until an operation on the OK button is accepted through the touch panel 17 (the result in S609 is No). If the CPU 11 accepts an operation on the OK button (the result in S609 is Yes), the CPU 11 causes the process to proceed to S607.

Thus, even if the target input function is currently unusable, the target input function can be set as an input function to be used. Since an alarm is displayed in S608, the user is notified that the input function selected for use is currently unusable. Accordingly, the user can make the input function usable again by accessing the device as necessary and eliminating the cause of the unusability.

In the processing in S404 described above in which an input function to be used is selected, if the device selected as an input device has a plurality of input functions, the plurality of input functions are displayed on the input/output registration screen so as to be selectable. Therefore, the user can select a desired one input function from the plurality of input functions as an input function to be used to execute a main function.

In the processing in S603, a mark is displayed for the input function that is currently unusable to call the user's attention, so the user can determine whether the input function displayed as being selectable is currently usable. Therefore, the user can know whether an input function selected from a plurality of input functions for use in a main function is currently usable before selecting the input function.

Figure 6B:
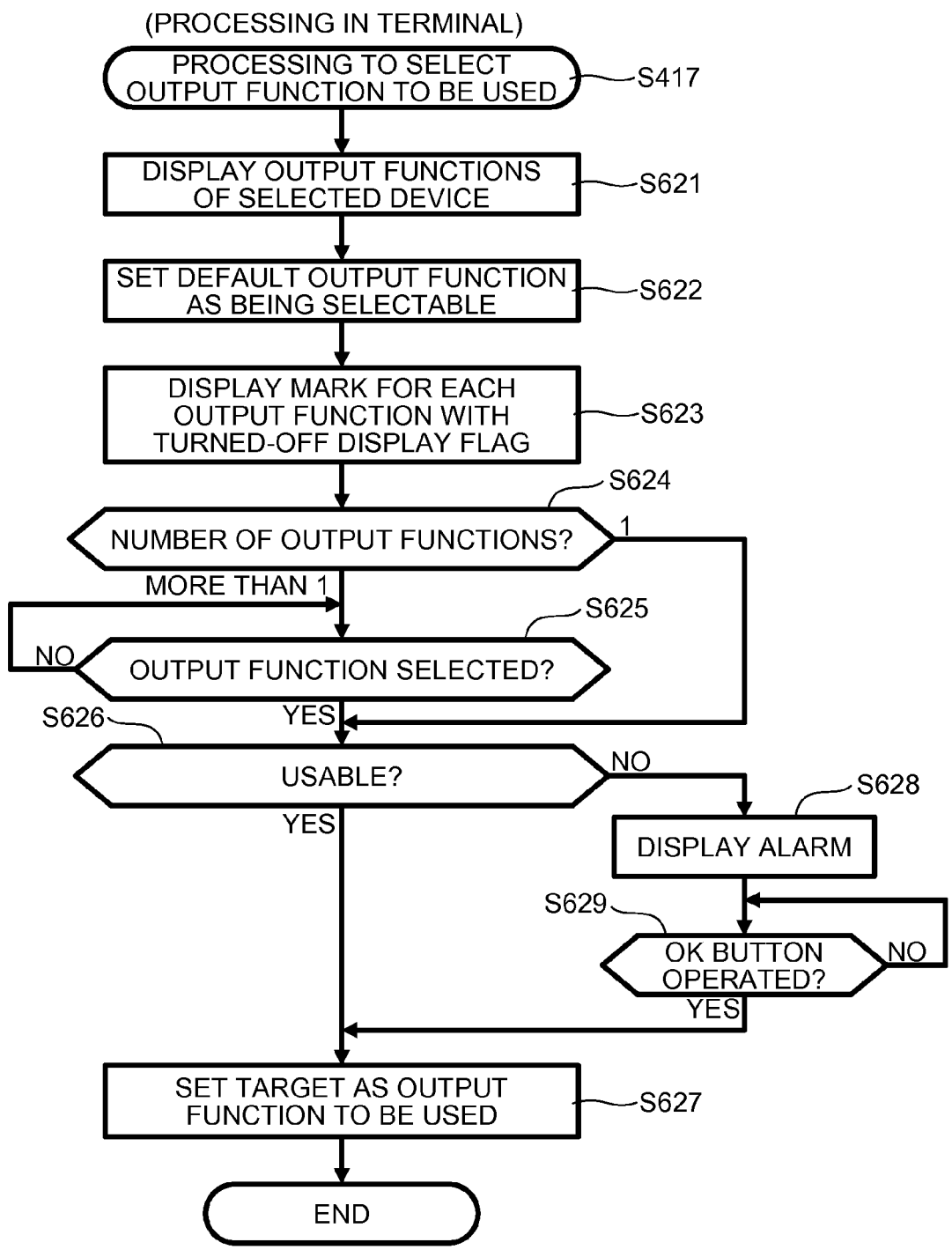

FIG. 6B is a flowchart illustrating the processing in S417 described above in which an output function to be used is selected. In this processing to select an output device to be used, the CPU 11 executes processing in S621 to S629, which is the same as in S601 to S609, except that the processing relates to output rather than input. Accordingly, the specific descriptions will be omitted. The display flags referenced in S623 and S626 are the display flags set in S526 in the processing, in FIG. 5B, in which output device candidates are displayed for the output functions of the device selected as an output device.

In the processing in S417 described above, in which an output function to be used is selected, if the device selected as an output device has a plurality of output functions, the plurality of output functions are displayed on the input/output registration screen so as to be selectable. Therefore, the user can select a desired one output function from the plurality of output functions as an output function to be used to execute a main function.

In the processing in S623, a mark is displayed for the output function that is currently unusable to call the user's attention, so the user can determine whether the output function displayed as being selectable is currently usable. Therefore, the user can know whether an output function selected from a plurality of output functions to use a main function is currently usable before selecting the output function.

As described above, in this embodiment, even if a device connected to the LAN 500 has a plurality of input functions or a plurality of output functions, an input function and an output function used to execute a main function can be independently set for the device and for the main function. Accordingly, even a peripheral device having many functions such as the MFP 80 can be used for an input function or an output function or both to implement a main function.

If a device having a plurality of input functions or a plurality of output functions is selected as an input device, only the input functions are displayed as being selectable. Therefore, it is possible to prevent an output function, which cannot be used as a function of the input device, from being selected mistakenly, in spite of the device being selected as an input device, as an input function used to execute a main function. Similarly, if the device is selected as an output device, only its output functions are displayed as being selectable. Therefore, it is possible to prevent an input function, which cannot be used as a function of the output device, from being selected mistakenly, in spite of the device being selected as an output device, as an output function used to execute a main function.

In the embodiment described above, the application 12b is an example of information processing program; the terminal 10 is an example of a terminal device; the scanner 60, printer 70, MFP 80 and service providing server 100 each are an example of an external device; the scanner 60, MFP 80, and service providing server 100 each are an example of an input device; printer 70, MFP 80 and service providing server 100 each are an example of an output device; the CPU 11 is an example of a control unit; the LCD 16 is an example of a display unit; the touch panel 17 is an example of an operation unit; the flash memory 12 is an example of a storage unit; the LAN 500 and Internet 800 each are an example of a network.

The CPU 11 that executes the processing in S306 is an example of a first information acquiring means. The CPU 11 that executes the processing in S403 is an example of an input device setting means. The CPU 11 that executes the processing in S416 is an example of an output device setting means. The CPU 11 that executes the processing in S604 to S607 and S624 to S627 each are an example of a function setting means. The CPU 11 that executes the processing in S213 is an example of a command output means. The CPU 11 that executes the processing in S601 and S621 is an example of a display control means. The CPU 11 that executes the processing in S505 and S525 is an example of a second information acquiring means. The CPU 11 that executes the processing in S301 is an example of an identifying means. The CPU 11 that executes the processing in S307 is an example of an input function deciding means. The CPU 11 that executes the processing in S311 is an example of an output function deciding means. The CPU 11 that executes the processing in S310 is an example of an input device storage means. The CPU 11 that executes the processing in S314 is an example of an output device storage means. The CPU 11 that executes the processing in S309 is an example of a first target setting means. The CPU 11 that executes the processing in S313 is an example of a second target setting means. The CPU 11 that executes the processing in S315 is an example of a first default setting means. The CPU 11 that executes the processing in S316 is an example of a second default setting means. The CPU 11 that executes the processing in S303 and S304 is an example of an identification display means.

Aspects of the disclosure have been described according to an embodiment, but the present disclosure is not limited to the embodiment described above. Indeed, various modifications are possible without departing from the intended scope of the present disclosure. For example, while in the above embodiment, the application 12b has been installed in the terminal 10, the terminal in which to install the application 12b is not limited to the terminal 10 exemplified above; application 12b may be installed in a tablet terminal, a digital camera, a personal computer, and the like. Additionally or alternatively, an Android (registered trademark) OS has been exemplified as the OS 12a installed in the terminal 10 in the above embodiment, another OS may be used.

In some arrangements, the application 12b may be installed in a server so that it functions like the terminal 10 in the embodiment described above. For example, a server in which the application 12b has been installed may execute the processing in the flowcharts illustrated in FIGS. 2 to 6A and 6B according to operations on a smart phone or another terminal. In such a case, in display processing, data involved in a display may be transmitted from the server to the terminal such as a smart phone and a display may be provided on the display unit of the terminal.

Although, the scanner 60 and MFP 80 have been exemplified as a device that becomes an input candidate in the above embodiment, the present disclosure is not so limited. For example, another device may be used so long as the device can execute an input function, e.g., a function of retrieving data that the terminal, in which the application 12b is installed, will receive as input data or a function of reading the data from a storage unit. Examples of input devices include a facsimile machine that receives facsimile data as input data and a database server that stores data to be read as input data. Similarly, a device that can execute an output function can be used as a device that becomes an output candidate. Examples of output devices include a 3D printer that performs three-dimensional printing, a sewing machine that performs embroidery by using embroidery data, and a projector that projects an image by using projection data.

In the above embodiment, even if an input function is currently unusable and a mark is displayed to call the user's attention, the currently unusable input function may be displayed in a selectable state in S404. This is also true for an output function that is currently unusable; the currently unusable output function may be displayed in a selectable state in S417. However, in another arrangement, currently unusable input functions and output functions may be displayed so as not to be selectable; for example, they may be grayed out. Although the user is informed that there is a currently unusable input function or output function, it is possible in this variation to prevent the user from selecting a currently unusable input function or output function and minimize the occurrence of an error during execution of a main function, which would otherwise be caused due to selection of such an unusable function.

Alternatively, currently unusable input functions and output functions might not be displayed. In this variation, it is possible to prevent the user from selecting a currently unusable input function or output function and minimize the occurrence of an error during execution of a main function, which would otherwise be caused due to selection of such an unusable function.

In the above embodiment, if communication is not possible with a device or if none of the input functions or output functions of a device with which communication is possible can be used, the device is not displayed as an input function candidate or an output function candidate. In some arrangements, the same configuration may apply to services or terminals. For example, if communication is not possible with a service or the terminal 10 or if none of the input functions or output functions of a service or the terminal 10 with which communication is possible can be used, the service or the terminal 10 might not be displayed as an input function candidate or output function candidate.

In the device registration processing (see FIG. 3) in the above embodiment, if the selected device has input functions, e.g., the result of a decision in S307 is Yes, the CPU 11 executes the processing in S308, S309, S310, and S315 to store input functions desired by the user in relation to the selected device. In one arrangement, if the selected device has input functions, the CPU 11 may omit the processing in S308, S309, S310, and S315 and may store all input functions of the selected device in relation to the selected device. Similarly, if the selected device has output functions, the CPU 11 may omit the processing in S312, S313, S314, and S316 and may store all output functions of the selected device in relation to the selected device.

Alternatively, if the selected device has a particular input function such as, for example, a scan function, all output functions of the selected device may be stored in relation to the selected device. Similarly, if the selected device has a particular output function such as, for example, a print function, all input functions of the selected device may be stored in relation to the selected device. In this case, only the particular input function or output function may be stored in relation to the selected device.

Although, in the above embodiment, a search packet may be broadcast to identify devices connected to the LAN 500, the disclosure is not so limited. For example, another method can be used to identify devices connected to the LAN 500. For example, a management server that manages devices connected to the LAN 500 may be provided on the Internet 800 or LAN 500. The terminal 10 may identify devices connected to the LAN 500 by transmitting an inquiry to the management server. In this variation, to identify devices connected to the LAN 500 in response to an inquiry to the management server is an example of the identifying means in the appended claims.

If the management server used in the above variation also manages the functions of each device, the setting range of each function, and other information, these information items may be acquired from the management server instead of acquiring them from the MIB of the device as in S306 described above. In this case, to acquire the functions of the device from the management server is an example of the first information acquiring means in the appended claims.

Although, in the above embodiment, all functions, including input functions and output functions, have been acquired from the relevant MIB in S306, the disclosure is not so limited. For example, if the MIB stores the input functions and output functions of the device separately, only the input functions of the device may be acquired from the MIB before a decision is made in S307 as to whether there are input functions. Similarly, only the output functions of the device may be acquired from the MIB before a decision is made in S311 as to whether there are output functions.

Although, in the above embodiment, if a service or the terminal 10 is selected as an input device, the file specification acceptance processing in S411 has been executed to specify a file to be read as input data, the disclosure is not so limited. For example, a folder may be specified. In this case, input data can be specified in folders. If a service or the terminal 10 is selected as an output device, the folder specification acceptance processing in S423 has been executed to specify a folder in which to store output data, this is not a limitation; a file may be specified.

Although, in the above embodiment, the CPU 11 has executed the processing illustrated in FIGS. 2 to 6A and 6B, a plurality of CPUs may execute the processing in these drawings in collaboration. Alternatively, application-specific integrated circuits (ASICs) and other types of ICs may execute the processing in these drawings independently or in collaboration. Alternatively, the CPU 11 and ICs such as ASICs may execute the processing in these drawings in collaboration.

What is claimed is:

1. A non-transitory computer-readable storage medium storing computer-readable instructions that, when executed by a processor, cause a computing device to:
   acquire function information of each of one or more functions provided by one or more external candidate devices configured to connect to a network;
   determine one or more input-candidate devices from the one or more external candidate devices, wherein function information acquired from each of the one or more input-candidate devices indicates at least one input function for executing a main function;
   display an input device selection screen including the determined one or more input-candidate devices on a display of the computing device;
   receive a user selection of an input device from the one or more input-candidate devices displayed in the input device selection screen;
   determine one or more output-candidate devices from the one or more external candidate devices, wherein function information acquired from each of the one or more output-candidate devices indicates at least one output function for executing the main function;
   display, while the input device selection screen is not displayed, an output device selection screen including the determined one or more output-candidate devices on the display;
   receive a user selection of an output device, from the one or more output-candidate devices displayed in the output device selection screen;
   determine a user selection of an input function of the selected input device and a user selection of an output function of the selected output device, wherein the determining the user selection of the input function or the user selection of the output function includes:
      generating a list comprising a plurality of user-selectable functions of the selected input device or the selected output device, and
      receiving the user selection of the input function or the user selection of the output function through the list;

register the selected input function and the selected output function for execution of the main function; and after the registration, output a command to the selected input device and the selected output device to execute the main function including the selected input function and the selected output function, respectively, without requiring further individual user selections of the selected input and output functions.

2. The storage medium according to claim 1, wherein the determining the user selection of the input function and the user selection of the output function includes:

generating a first list comprising a plurality of user-selectable input functions of the selected input device, the plurality of input functions being indicated in the function information acquired from the selected input device;

receiving the user selection of the input function through the first list; displayed on the display;

generating a second list comprising a plurality of user-selectable output functions of the selected output device, the plurality of output functions being indicated in the function information acquired from the selected output device; and receiving the user selection of the output function through the second list displayed on the display.

3. The storage medium according to claim 2, wherein generating the first list includes generating the first list comprising the plurality of user-selectable functions of the selected input device, and wherein the instructions, when executed, further cause the computing device to:

when the selected input device includes both input and output functions, generating the first list comprising only input functions of the selected input device.

4. The storage medium according to claim 2, wherein generating the second list includes generating the second list comprising the plurality of user-selectable functions of the selected output device, and wherein the instructions, when executed, further cause the computing device to:

when the selected output device includes both input and output functions, generating the second list comprising only output functions of the selected output device.

5. The storage medium according to claim 1, wherein the instructions, when executed, further cause the computing device to:

acquire status information that indicates whether a function indicated in the acquired function information is usable or unusable, wherein generating the list comprising the plurality of user-selectable functions of the selected input device or the selected output device includes visually distinguishing, in the list of the plurality of user-selectable functions, one or more usable functions from one or more unusable functions.

6. The storage medium according to claim 5, wherein generating the list includes adding the one or more usable functions in a user-selectable manner and the one or more unusable functions in a non-user-selectable manner.

7. The storage medium according to claim 1, wherein one of the selected output device and the selected input device includes a plurality of functions, wherein the instructions, when executed, further cause the computing device to:

acquire status information that indicates whether each of the plurality of functions is usable or unusable, wherein generating the list includes adding only usable functions of the one of the selected output device and the selected input device to the list.

8. The storage medium according to claim 1, wherein the instructions, when executed, further cause the computing device to, prior to or in conjunction with acquiring the function information for the one or more functions provided by the one or more external candidate devices, and prior to receiving the selections of the input device and the output device, and for each of the one or more external candidates devices:

identify the respective external candidate device connected to the network;

determine whether the identified respective external candidate device has an input function;

determine whether the identified respective external candidate device has an output function;

if the respective external candidate device is determined to have the input function, store the respective external candidate device in a storage unit as a candidate input device, in association with at least input function information identifying one or more input functions provided by the identified respective external candidate device; and if the respective external candidate device is determined to have the input function, store the respective external candidate device in the storage unit as a candidate output device, in association with at least output function information identifying one or more output functions provided by the identified respective external candidate device.

9. The storage medium according to claim 8, wherein storing the respective external candidate device in association with at least the input function information identifying the one or more input functions includes:

when the respective external candidate device is determined to have a plurality of input functions, receiving a user selection of one or more of the plurality of input functions to be stored in association with the respective external candidate device, and wherein storing the respective external candidate device in association with at least the output function information identifying the one or more output functions includes:

when the respective external candidate device is determined to have a plurality of output functions, receiving a user selection of one or more of the plurality of output functions, to be stored in association with the respective external candidate device.

10. The storage medium according to claim 8, wherein storing the respective external candidate device in association with at least the input function information identifying the one or more input functions includes:

storing the respective external candidate device in association with a setting range of a parameter of an input function of the respective external candidate device, and wherein storing the respective external candidate device in association with at least the output function information identifying the one or more output functions includes:

storing the respective external candidate device in association with a setting range of a parameter of an output function of the respective external candidate device.

11. The storage medium according to claim 8, wherein the instructions, when executed, further cause the computing device to:

set, when the respective external candidate device is determined to have a plurality of input functions, one of the plurality of input functions as a default input function based on a user selection;

set, when the respective external candidate device is determined to have a plurality of output functions, one of the plurality of output functions as a default output function based on a user selection;
store the respective external candidate device in association with information indicating the default input function; and
store the respective external candidate device of the output device in relation to information indicating the default output function.

12. The storage medium according to claim 1, wherein the instructions, when executed, further cause the computing device to:
provide a display indicating the one or more external candidate devices, wherein the display provides an external candidate device previously registered by the computing device in a non-user-selectable manner and an external candidate device not previously registered in a user-selectable manner.

13. The storage medium according to claim 1, wherein, when displaying the one or more input-candidate devices on the display, only the one or more input-candidate devices, among the one or more external candidate devices, are displayed.

14. The storage medium according to claim 1, wherein when displaying the one or more output-candidate devices on the display, only the one or more output-candidate devices, among the one or more external candidate devices, are displayed.

15. An apparatus comprising:
at least one processor; and
a memory storing computer-readable instructions that, when executed by the at least one processor, instructing the apparatus to:
acquire function information of each of one or more functions provided by one or more external candidate devices configured to connect to a network;
determine one or more input-candidate devices from the one or more external candidate devices, wherein function information acquired from each of the one or more input-candidate devices indicates at least one input function for executing a main function;
display an input device selection screen including the determined one or more input-candidate devices on a display of the apparatus;
receive a user selection of an input device from the one or more input-candidate devices displayed in the input device selection screen;
determine one or more output-candidate devices from the one or more external candidate devices, wherein function information acquired from each of the one or more output-candidate devices indicates at least one output function for executing the main function;
display, while the input device selection screen is not displayed, an output device selection screen including the determined one or more output-candidate devices on the display;
receive a user selection of an output device from the one or more output-candidate devices displayed in the output device selection screen;
determine a user selection of an input function of the selected input device and a user selection of an output function of the selected output device, wherein the determining the user selection of the input function or the user selection of the output function includes:
generating a list comprising a plurality of user-selectable functions of the selected input device or the selected output device, and
receiving the user selection of the input function or the user selection of the output function through the list;
register the selected input function and the selected output function for execution of the main function; and
after the registration, output a command to the selected input device and the selected output device to execute the main function including the selected input function and the selected output function, respectively, without requiring further individual user selections of the selected input and output functions.

16. A non-transitory computer readable medium storing computer readable instructions that, when executed by a processor, cause a computing device to:
determine one or more input-candidate devices from one or more external candidate devices, wherein function information acquired from each of the one or more input-candidate devices indicates at least one input function for executing a main function;
display an input device selection screen including the determined one or more input-candidate devices on a display of the computing device;
receive a selection of an input device from the one or more input-candidate devices displayed in the input device selection screen;
determine one or more output-candidate devices from one or more external candidate devices, wherein function information acquired from each of the one or more output-candidate devices indicates at least one output function for executing a main function;
display, while the input device selection screen is not displayed, the determined one or more output-candidate devices in an output device selection screen on the display;
receive a selection of an output device from the one or more output-candidate devices displayed in the output device selection screen;
determine a selected input function and a selected output function, including:
generating at least one of: an input function list including at least one input function provided by the selected input device and an output function list including at least one output function provided by the selected output device, and
receiving one or more selections from the generated at least one of: the input function list and the output function list; and
register the selected input function and the selected output function as a user-selectable combined function,
wherein execution of the combined function causes execution of the selected input function by the selected input device and execution of the selected output function by the selected output device without requiring further user selection of the selected input and output functions, and
wherein the generated at least one of: the input function list and the output function list includes a plurality of functions.

17. A non-transitory computer-readable storage medium storing computer-readable instructions that, when executed by a processor, cause a computing device to:
acquire function information for one or more functions provided by one or more external candidate devices configured to connect to a network;

receive a user selection of an input device, from at least one candidate device having an input function of the one or more external candidate devices, for executing a main function;

receive a user selection of an output device, from at least one candidate device having an output function of the one or more external candidate devices, for executing the main function;

display a first list comprising a plurality of input functions of the selected input device on the display, the plurality of input functions being indicated in the function information acquired from the selected input device;

receive a user selection of an input function through the first list;

display a second list comprising a plurality of output functions of the selected output device on the display, the plurality of output functions being indicated in the function information acquired from the selected output device on the display;

receiving a user selection of an output function through the second list;

register the selected input function and the selected output function for execution of the main function: and after the registration, output a command to the selected input device and the selected output device to execute the main function including the selected input function and the selected output function, respectively, without requiring further individual user selections of the selected input and output functions.

18. The storage medium according to claim 17, wherein the selected input device is a multi-function device, and wherein the first list comprising a scanning function and a facsimile reception function.

19. The storage medium according to claim 17, wherein the selected output device is a multi-function device, and wherein the second list comprising a printing function and a facsimile transmission function.

\* \* \* \* \*